United States Patent
Manasian et al.

[15] 3,674,139
[45] July 4, 1972

[54] COTTON BALE COVER

[72] Inventors: Arthur E. Manasian, Needham; Carl J. Papenfuss, Holliston; William F. Piekarski, Dracut, all of Mass.

[73] Assignee: Ludlow Corporation, Needham Heights, Mass.

[22] Filed: Sept. 12, 1969

[21] Appl. No.: 857,508

[52] U.S. Cl. ..........................206/83.5, 150/52 R, 161/88, 161/113, 161/DIG. 6
[51] Int. Cl. .......................................B65d 71/00, B32b 3/10
[58] Field of Search..................161/79, 80, 81, 82, 84, 85, 161/88, 89, 92, 95, 55, 57, 58, 109, 113, DIG. 6; 206/83.5; 150/52 R

[56] References Cited

UNITED STATES PATENTS

| | | | |
|---|---|---|---|
| 983,492 | 2/1911 | Harriss | 206/83.5 X |
| 1,574,885 | 3/1926 | Henne | 206/83.5 X |
| 2,902,395 | 9/1959 | Hirschy et al. | 161/82 X |
| 3,019,147 | 1/1962 | Nalle | 161/109 |
| 3,030,245 | 4/1962 | Greiner et al. | 156/32 |
| 3,072,511 | 1/1963 | Harwood | 161/85 |
| 3,118,180 | 1/1964 | Nalle | 18/13 |
| 3,186,893 | 6/1965 | Mercer | 161/60 |
| 3,110,609 | 11/1963 | Bletzinger | 161/57 X |
| 3,307,992 | 3/1967 | Condon et al. | 161/57 X |

*Primary Examiner*—Robert F. Burnett
*Assistant Examiner*—Roger L. May
*Attorney*—Cesari and McKenna

[57] ABSTRACT

A nonwoven cotton bale cover formed of a bonded laminate of three layers of material. A grid-like layer of extruded or knitted filament net is sandwiched between two layers of cotton material, at least one of which is a nonwoven cotton fabric. The layers are adhesively bonded to the net to form a three-part laminar structure.

4 Claims, 2 Drawing Figures

PATENTED JUL 4 1972  3,674,139

INVENTORS
ARTHUR E. MANASIAN
CARL J. PAPENFUSS
WILLIAM F. PIEKARSKI

BY Blair, Cesari & St. Onge
ATTORNEYS

3,674,139

COTTON BALE COVER

BACKGROUND OF THE INVENTION

A. Field of the Invention

The present invention relates to web laminates. More particularly, it relates to cotton bale cover having at least one nonwoven cotton web as an integral part thereof.

B. Prior Art

For many years, the cotton industry has sought to find a more durable bale covering to protect the baled cotton from contamination and damage. The two bale cover types now commonly used are those made from coarse jute yarn and those made from polypropylene ribbon yarn. Both types of covers are woven fabrics.

The woven jute bale cover is highly deficient as a protective medium. The loose weaving permits the entry of dirt, solids and moisture. It is therefore common to find mildew on the top and bottom surfaces of the stored cotton bales which are covered with woven jute. Furthermore, jute covers become unraveled and so badly damaged in bale handling that there is often little of the cover left by the time the bale reaches the cotton mill. The damaged and broken strands of jute yarn and jute fiber contaminate the cotton and, because of the fuzzy texture of the jute, are difficult to remove from the cotton. Another drawback of the jute bale covering is that its loosely fibrous and open texture renders the bale prone to ignition from sparks which may contact the bale. Since the likelihood of bale fires is increased by the use of jute covers, the accompanying higher insurance rates and danger to inventory and employees is a detrimental factor which must be considered by both the cotton gins and the mills.

When woven fabrics of polypropylene ribbon yarn are used as bale coverings, greater cover strength is achieved, but other problems arise. For example, polypropylene ribbon causes a highly vexatious form of contamination. When the polypropylene ribbon yarn is damaged in bale handling, the tiny strands of polypropylene that contaminate the bale are not readily detectable when the cover is removed and the bale is processed through the mill. These polypropylene contaminants, however, cause cotton yarn imperfections that are highly visible in colored cotton fabrics. The reason for this is that the polypropylene fragments are resistant to all known methods of cotton dyeing and appear as white specks in the finished material. Contamination with both the above type covers is aggravated when the covers are slit for sampling and grading of the cotton since neither fabric is readily subject to patching. The jute resists patching because of its great fuzziness, the polypropylene resists patching because of its general incompatibility with most commonly used adhesives.

In addition to the problems inherent in the typical bale cover materials, there is also a relatively high cost associated with the handling of bale covers. Usually, bale covers are shipped to the cotton gins in a precut and folded form. Generally, 50 folded covers are shipped in each package. With this arrangement, there is a considerable amount of labor involved in the cutting, folding and shipping of the bale covers and in the unwrapping and unfolding of the covers for use. Substantial cost savings could therefore be achieved if some of this cover handling could be eliminated.

It is therefore an object of the present invention to provide a low cost, tear- and abrasion- resistant cotton bale cover that does not contaminate the bale.

Another object of the invention is to provide a novel process for forming such a bale.

Another object of the present invention is to provide a low cost cotton bale cover that facilitates slitting and sampling of the bale and repair of the cover.

A further object of the invention is to provide a cotton bale cover that may be shipped and dispensed in bulk form rather than in precut and folded form.

Other objects of the invention will be obvious to those skilled in the art on reading the instant disclosure.

SUMMARY OF THE INVENTION

This invention relates to a cotton bale cover formed as a three-layer laminate. The outer layer is a cotton fabric. The inner layer, which is in contact with the bale, is also a cotton fabric. At least one of these two cotton fabrics must be nonwoven. Sandwiched between the inner and outer layers is a grid formed of an extruded or knitted filament net. The three layers are preferably bonded by a latex adhesive with which the layers are impregnated after they have been assembled together. The latex adhesive leaves a polymeric residue on the outer surface of the bale cover which contributes improved abrasion resistance to the whole.

This laminate structure provides superb tear resistance and excellent cut resistance. The tear resistance is largely contributed by the sandwiched net material. Moreover, this novel structure does not permit contamination of the bale with the non-compatible fiber because it is constructed of cotton and with at least one nonwoven cotton web acting to filter out dirt. Bale covers so constructed can be readily printed upon and, once slitted by a knife for inspection purposes, may be resealed by use of conventional reinforcing tape. The best bale covers, in this respect, are those having a nonwoven cotton web on the outer surface thereof.

It has been found that the drape of covers formed according to the invention is excellent and, consequently, it is easier to cover or "dress" bales of cotton herewith. Moreover, the manufacture of these covers can be carried out on conventional processing equipment; specialized equipment is not required.

The bale cover of the invention has been found to be adequate or superior with respect to tensile strength torque tear testing, and burst testing. Moreover, the bale cover of the invention has been subjected to practical testing using the bale hooks with which cotton bales are often handled.

The nonwoven cotton layers of the laminate may be formed of 100 percent cotton fiber or may be formed of cotton fiber and a minor amount, preferably not over 25 percent, of other fibers which are sufficiently similar in chemical nature to cotton fibers so that they bleach and dye similarly and, therefore, do not become obvious flaws in fabrics into which they are inadvertently incorporated. The most advantageous of such fibers are strength-imparting fibers such as rayon fibers. Their use is particularly desirable in the outermost layer of the bale cover laminate.

The extruded or filament net need not be in a woven or knitted form. It can consist of strands overlaying one another and arranged at angles to one another in such a way as to form a grid. Grid as used herein, therefore, is not limited to a particular pattern with filaments arranged at right angles, but is used as a broader term, to include materials laid at any such angle as to provide good resistance to a cutting action from whatever transverse direction such action should be initiated.

The impregnating adhesive is advantageously a water-based adhesive material, preferably a latex type material of from about 5 percent to about 30 percent in solid content. Among suitable lattices are those formed with acrylic polymers, poly (vinylacetate), styrene-butadiene rubber lattices, styrene-butadiene-acrylonitride terpolymer lattices and the like.

The bale cover of the invention can be formed into a coherent laminate by bonding techniques other than that described above. For example, the grid interlayer, if formed out of a thermoplastic material, can be fused under sufficient pressure so that it permeates into the innermost and outermost fabrics of the bale cover, thereby bonding them together. Similarly a thermoplastic-powder, e.g., an ethylene acrylate polymer, can be powdered over the grid after one web is attached thereto and used in the bonding of the outermost and innermost layers of the bale cover by applying heat and pressure to melt the polymer and obtain at least a partial impregnation of the polymer into the cotton layers.

Nevertheless, the wet impregnation technique is preferred, in part because it imparts very desirable characteristics to the outer surface of the bale cover, especially when a relatively smooth or nonwoven fabric is used on the outer surface of the bale cover.

BRIEF DESCRIPTION OF THE DRAWING

For a fuller understanding of the nature and objects of the invention, reference should be had to the following detailed description taken in connection with the drawing in which.

DESCRIPTION OF THE PREFERRED EMBODIMENTS

Figure 1:
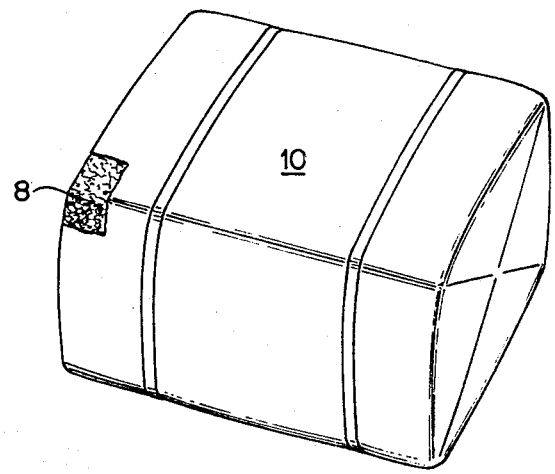
FIG. 1 is a perspective view of a cotton bale wrapped in the cover of my invention.
Figure 2:
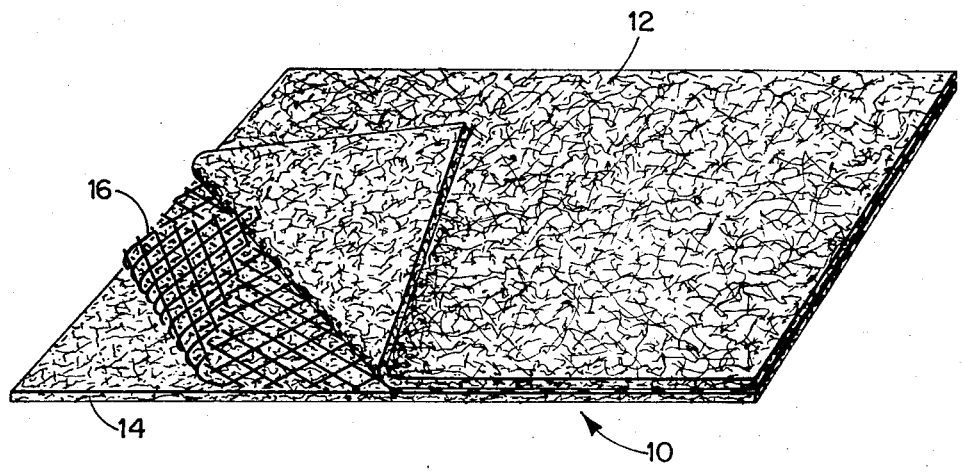
FIG. 2 is a perspective view, partially peeled open, of the bale cover laminate.

As shown in FIG. 1, baled cotton 8 is wrapped in cover 10. The cotton bale cover laminate 10, however, is made of three layers as illustrated in FIG. 2. The outer layer 12 is a nonwoven web formed of cotton fibers. The inner layer, which is to be next to the bale, is also made of nonwoven cotton. Sandwiched between outer layer 12 and nonwoven cotton inner layer 14 is an extruded or filament net 16 which may be made of any suitable, low cost, mildew—or corrosion—resistant fibers, such as fiberglass or oriented polypropylene.

EXAMPLE I

In making the laminated bale cover of the invention, a nonwoven cotton web having a weight of about 1½ ounces per yard was needle punched to a Conwed-extruder and oriented net (an oriented polypropylene fiber net made by the Conwed Corporation of Minneapolis, Minnesota), thereby forming a loose assembly of the web and net. A second nonwoven cotton web of the same type previously attached to the net was needle punched to the aforesaid cotton-propylene assembly in such a way that the propylene net was sandwiched between the two nonwoven cotton webs.

The sandwich thus formed is then impregnated with a polyvinyl acetate latex and subsequently dried by being passed through a hot air dryer. After being dried, the resulting laminate is calendered and thereupon formed into bale covers.

EXAMPLE II

A bale cover is produced according to Example I except that the outermost layer is a lightweight cotton scrim rather than a nonwoven cotton web.

When made in accordance with the foregoing technique, our laminate provides a strong, tear- and abrasion-resistant material that will maintain its integrity despite the rough handling that a cotton bale normally encounters. Although our material is porous, the pores are too small to admit dirt, soil or water. On the other hand, the pores are sufficiently large to permit free passage of air. Moreover, our material will not delaminate or unravel. It is highly resistant to cutting by the steel bands that bind the bale and to tearing as the result of the use of bale hooks by handlers. A non-woven outside layer of the cover is devoid of any fuzziness which greatly minimizes or eliminates the danger of bale fires. Furthermore, this lack of fuzziness permits the use of reinforced adhesive tape to reseal slits which are made in the cover to sample cotton packaged in the bale.

Another unique feature of the cotton bale laminate is that it may be shipped in roll form. By perforating the rolled material at predetermined intervals, it is possible to tear off segments of the material as needed. It is, of course, most desirable in such an operation to have the perforations register with and cut a majority of the net interlayer strands so that they do not impart excessive tear strength along a line of perforations. In this manner, each segment torn from the roll may be used as a cotton bale cover thus obviating the necessity of precutting, folding, packaging, shipping, unpacking and unfolding the bale cover for use. From this it may be seen that our bale cover may also provide a substantial savings in labor as compared to prior art covers and techniques for packaging and shipping the covers.

It will thus be seen that the objects set forth above, among those made apparent from the preceding description, are efficiently attained and, since certain changes may be made in carrying out the above method without departing from the scope of the invention, it is intended that all matter contained in the above description shall be interpreted as illustrative and not in a limiting sense.

What is claimed is:

1. A package wherein a bale of cotton is covered with a cover comprising
    A. An outer layer of cotton;
    B. A cotton inner layer;
    C. An extruded or filament net interposed between said outer and inner layers and
    D. A polymeric impregnant
        1. forming means to bond said layers together and
        2. forming a smooth polymeric, abrasion-resistant surface on said bale cover.

2. A package as defined in claim 1 wherein said outer layer (12) is a woven cotton fabric.

3. A package as defined in claim 1 wherein said outer layer (12) is a nonwoven cotton fabric.

4. A package as defined in claim 1 wherein said net (16) is a thermoplastic material which forms a bond between said outer layer (12) and inner layer (14) as an auxiliary adhesive material.

* * * * *